United States Patent [19]

Anderson et al.

[11] Patent Number: 5,697,342
[45] Date of Patent: Dec. 16, 1997

[54] HYDRAULICALLY-ACTUATED FUEL INJECTOR WITH DIRECT CONTROL NEEDLE VALVE

[75] Inventors: Michael D. Anderson, Metamora; Dennis H. Gibson; Gregory W. Hefler, both of Chillicothe, all of Ill.; Dale C. Maley, Watkinsville, Ga.; Ronald D. Shinogle, Peoria; Mark F. Sommars, Sparland, both of Ill.

[73] Assignee: Caterpillar Inc., Peoria, Ill.

[21] Appl. No.: 668,552

[22] Filed: Jun. 21, 1996

Related U.S. Application Data

[63] Continuation-in-part of Ser. No. 489,660, Jun. 12, 1995, which is a continuation of Ser. No. 283,232, Jul. 29, 1994, Pat. No. 5,463,996.

[51] Int. Cl.⁶ ............................................. F02M 7/00
[52] U.S. Cl. .................................... 123/446; 239/96
[58] Field of Search ................................. 123/446, 447, 123/467; 239/88, 89, 90

[56] References Cited

U.S. PATENT DOCUMENTS

| | | |
|---|---|---|
| Re. 33,270 | 7/1990 | Beck et al. |
| 3,175,771 | 3/1965 | Breting |
| 3,241,768 | 3/1966 | Croft |
| 3,361,161 | 1/1968 | Schwartz |
| 3,443,760 | 5/1969 | Simmons |
| 3,450,353 | 6/1969 | Eckert |
| 3,532,121 | 10/1970 | Sturman et al. |
| 3,570,806 | 3/1971 | Sturman et al. |
| 3,570,807 | 3/1971 | Sturman et al. |
| 3,570,833 | 3/1971 | Sturman et al. |
| 3,592,568 | 7/1971 | Fenne |
| 3,604,959 | 9/1971 | Sturman |
| 3,661,130 | 5/1972 | Eheim |
| 3,683,239 | 8/1972 | Sturman |
| 3,742,918 | 7/1973 | Murtin et al. |
| 3,743,898 | 7/1973 | Murtin et al. |
| 3,821,967 | 7/1974 | Sturman et al. |
| 3,989,066 | 11/1976 | Sturman et al. |
| 4,040,569 | 8/1977 | Knapp |
| 4,064,855 | 12/1977 | Johnson |
| 4,096,995 | 6/1978 | Klomp |
| 4,107,546 | 8/1978 | Sturman et al. |
| 4,108,419 | 8/1978 | Sturman et al. |
| 4,114,647 | 9/1978 | Sturman et al. |
| 4,120,456 | 10/1978 | Kimura et al. |

(List continued on next page.)

OTHER PUBLICATIONS

Authors: R. Cihocki, P. Herzog, F. Schweinzer: "Latest Findings In Development of High-Speed Direct Injection [HSDI] Diesel Engines In Passenger Vehicles"; thirty pages, which includes original German publication with Figs. published Apr. 28, 1994 in Germany.

Authors: K. Prescher, W. Bauer, W. Schaffitz; "Common Rail Injection Systems With Characteristics Independent of Engine Speed And With High Injection Pressure—Diesel Engine Potential For The Future"; thirty-nine pages, which includes original German publication with Figs.; published Apr. 28, 1994 in Germany.

(List continued on next page.)

Primary Examiner—Thomas N. Moulis
Attorney, Agent, or Firm—Liell & McNeil

[57] ABSTRACT

A hydraulically actuated fuel injector includes an injector body having a needle control chamber, a nozzle chamber, and a nozzle outlet that opens to the nozzle chamber. Fuel within the injector is hydraulically pressurized during each injection cycle. A needle valve is positioned to reciprocate in the nozzle chamber between an open position in which the nozzle outlet is open and a closed position in which the nozzle outlet is closed. The needle valve includes a closing hydraulic surface exposed to pressure in the needle control chamber. A needle control valve is mounted within the injector body and is moveable between an off position in which the needle control chamber is opened to a source of high pressure fluid and an on position in which the needle control chamber is opened to a low pressure passage.

43 Claims, 7 Drawing Sheets

U.S. PATENT DOCUMENTS

| | | |
|---|---|---|
| 4,129,255 | 12/1978 | Bader, Jr. et al. . |
| 4,192,466 | 3/1980 | Tanasawa et al. . |
| 4,258,674 | 3/1981 | Wolff . |
| 4,269,360 | 5/1981 | Kopse . |
| 4,343,280 | 8/1982 | Inscomb . |
| 4,392,612 | 7/1983 | Deckard et al. . |
| 4,409,638 | 10/1983 | Sturman et al. . |
| 4,417,557 | 11/1983 | Walter . |
| 4,482,094 | 11/1984 | Knape . |
| 4,498,625 | 2/1985 | Schechter . |
| 4,501,290 | 2/1985 | Sturman et al. . |
| 4,516,600 | 5/1985 | Sturman et al. . |
| 4,541,454 | 9/1985 | Sturman et al. . |
| 4,544,096 | 10/1985 | Burnett .................................. 239/92 |
| 4,561,701 | 12/1985 | Fujii et al. . |
| 4,568,021 | 2/1986 | Deckard et al. . |
| 4,580,598 | 4/1986 | Itoh . |
| 4,586,656 | 5/1986 | Wich . |
| 4,618,095 | 10/1986 | Spoolstra ............................... 239/90 |
| 4,628,881 | 12/1986 | Beck et al. ........................... 123/447 |
| 4,635,854 | 1/1987 | Ishibashi . |
| 4,671,232 | 6/1987 | Stumpp et al. . |
| 4,681,080 | 7/1987 | Schukoff . |
| 4,709,679 | 12/1987 | Djordjevic et al. . |
| 4,714,066 | 12/1987 | Jordan . |
| 4,721,253 | 1/1988 | Noguchi et al. . |
| 4,777,921 | 10/1988 | Miyaki et al. . |
| 4,782,807 | 11/1988 | Takahashi . |
| 4,811,221 | 3/1989 | Sturman et al. . |
| 4,813,601 | 3/1989 | Schwerdt ............................... 239/91 |
| 4,831,989 | 5/1989 | Haines . |
| 4,838,232 | 6/1989 | Wich . |
| 4,840,160 | 6/1989 | Zipprath et al. . |
| 4,870,940 | 10/1989 | Filippi et al. . |
| 4,934,599 | 6/1990 | Hasagawa . |
| 4,946,103 | 8/1990 | Ganser . |
| 4,951,874 | 8/1990 | Ohnishi et al. ....................... 239/88 |
| 4,964,571 | 10/1990 | Taue et al. . |
| 4,969,600 | 11/1990 | Nicol ..................................... 239/88 |
| 4,993,637 | 2/1991 | Kanesaka . |
| 5,007,584 | 4/1991 | Rossignol . |
| 5,033,442 | 7/1991 | Perr et al. ............................ 123/502 |
| 5,046,472 | 9/1991 | Linder . |
| 5,072,882 | 12/1991 | Taue et al. . |
| 5,082,180 | 1/1992 | Kubo et al. . |
| 5,109,822 | 5/1992 | Martin . |
| 5,121,730 | 6/1992 | Ansman et al. . |
| 5,133,645 | 7/1992 | Crowley et al. . |
| 5,141,164 | 8/1992 | Ohno et al. . |
| 5,143,291 | 9/1992 | Grinsteiner .......................... 239/88 |
| 5,155,461 | 10/1992 | Teerman et al. . |
| 5,201,295 | 4/1993 | Kimberley et al. . |
| 5,221,046 | 6/1993 | Timmer . |
| 5,230,613 | 7/1993 | Hilsbos et al. . |
| 5,235,954 | 8/1993 | Sverdlin . |
| 5,265,804 | 11/1993 | Brunel . |
| 5,271,563 | 12/1993 | Cerny et al. . |
| 5,335,852 | 8/1994 | Muntean et al. ..................... 239/89 |
| 5,347,970 | 9/1994 | Pape et al. . |
| 5,353,991 | 10/1994 | De Nagel et al. . |
| 5,370,095 | 12/1994 | Yamaguchi et al. . |
| 5,441,028 | 8/1995 | Felhofer . |
| 5,477,828 | 12/1995 | Barnes . |
| 5,485,820 | 1/1996 | Iwaszkiewicz . |
| 5,485,957 | 1/1996 | Sturman . |
| 5,585,547 | 12/1996 | Sturman et al. . |

OTHER PUBLICATIONS

Authors: K. Egger, P. Reisenbichler, R. Leónhard; "Common Rail Injection System For Diesel Engines—Analysis, Potential Future"; twenty-eight pages, which includes original German publication with Figs.; published Apr. 28, 1994 in Germany.

Author: A Dolenc; "The Injection Equipment of Future High–Speed D.I. Diesel Engines With Respect to Power and Pollution Requirements"; ten pages: published Feb. 7, 1990 in Great Britain.

Authors: T.C. Tow, D.A. Pierpont, R.D. Reitz; "Reducing Particulate and $NO_x$ Emissions by Using Multiple Injections in a Heavy Duty D.I. Diesel Engine"; seventeen pages; published Feb. 28, 1994 in the United States.

Authors: N. John Beck, Robert L. Barkhimer, Michael A. Calkins, William P. Johnson, William E. Wesaloh; "Direct Digital Control of Electronic Unit Injectors"; twelve pages; published Feb. 27, 1984 in the United States.

Authors: N. John Beck, S.K. Chen; "Injection Rate Shaping And High Speed Combustion Analysis—New Tools For Diesel Engine Combustion Development"; twenty pages; published Feb. 26, 1990 in the United States.

Authors: R. Racine, M. Miettaux, L Drutal, J. Heidt; "Application of a High Flexible Electronic Injection System to a Heavy Duty Diesel Engine"; fourteen pages; published Feb. 25, 1991 in the United States.

Authors: M. Miyake, H. Fujisawa, A. Masuda, Y. Yamamoto; "Development of New Electronically Controlled Fuel Injection System ECE–U2 For Diesel Engines"; seventeen pages; believed to have been published in 1991.

Author: RKM Inc.; "Servo Jet Electronic Fuel Injection HSV High Speed Solenoid Valves", four pages; published 1985 in the United States.

Author: T.C. Tow; "The Effect of Multiple Pulse Injection, Injection Rate and Injection Pressure on Particulate and $No_x$ Emission From A D.I. Diesel Engine"; one hundred forty-seven pages; published in 1993 in the United States.

Fig_4

HYDRAULICALLY-ACTUATED FUEL INJECTOR WITH DIRECT CONTROL NEEDLE VALVE

RELATION TO OTHER PATENT APPLICATIONS

This application is a continuation-in-part of co-pending application Ser. No. 08/489,660, filed Jun. 12, 1995 and entitled HYDRAULICALLY-ACTUATED FLUID INJECTOR HAVING PRE-INJECTION PRESSURIZABLE FLUID AND DIRECT-OPERATED CHECK, which was a continuation of application Ser. No. 08/283,232, filed Jul. 29, 1994 with the same title (now U.S. Pat. No. 5,463,996).

TECHNICAL FIELD

The present invention relates generally to fuel injection, and more particularly to hydraulically-actuated fluid injectors with direct control needle valves, and fuel injection systems using same.

BACKGROUND ART

Known hydraulically-actuated fuel injection systems and/or components are shown, for example, include U.S. Pat. No. 5,121,730 issued to Ausman et al. on Jun. 16, 1992, U.S. Pat. No. 5,271,371 issued to Meints et al. on Dec. 21, 1993, and U.S. Pat. No. 5,297,523 issued to Hafner et al. on Mar. 29, 1994. In these hydraulically actuated fuel injectors, a spring biased needle check opens to commence fuel injection when pressure is raised by an intensifier piston/plunger assembly to a valve opening pressure. The intensifier piston is acted upon by a relatively high pressure actuation fluid, such as engine lubricating oil, when a solenoid control valve opens the injector's high pressure inlet. Injection is ended by deactivating the solenoid to release pressure above the intensifier piston. This in turn causes a drop in fuel pressure causing the needle check to close and end injection under the action of its return spring. While these hydraulically actuated fuel injectors have performed magnificently over many years, there remains room for improvement, especially in the area of shaping an injection rate trace from beginning to end to precisely suit a set of engine operating conditions.

Over the years, engineers have discovered that engine emissions can be significantly reduced at certain operating conditions by providing a particular injection rate trace. In many cases emissions are improved when the initial injection rate is controllable, and when there is a nearly vertical abrupt end to injection. While these prior hydraulically actuated fuel injection systems have some ability to control the injection rate shape, there remains room to improve the ability to control injection rate shape with hydraulically actuated fuel injection systems.

The present invention is intended to improve the ability of hydraulically actuated fuel injectors to better control an injection rate shape during each injection event.

DISCLOSURE OF THE INVENTION

In one embodiment of the present invention, a hydraulically actuated fuel injector comprises an injector body having a needle control chamber, a nozzle chamber and a nozzle outlet that opens to the nozzle chamber. Some hydraulic means, such as a typical intensifier piston/plunger assembly, is mounted within the injector for pressurizing fuel in the nozzle chamber. A needle valve is positioned to reciprocate in the nozzle chamber between an open position in which the nozzle outlet is open and closed position in which the nozzle outlet is closed. The needle valve includes a closing hydraulic surface exposed to pressure in the needle control chamber. A needle control valve is mounted within the injector body and is moveable between an off position in which the needle control chamber is opened to a source of high pressure fluid and an on position in which the needle control chamber is opened to a low pressure passage.

In another embodiment, a fuel injection system comprises a plurality of hydraulically actuated fuel injectors with direct control needle valves. Each injector has a needle valve with a closing hydraulic surface exposed to pressure in a needle control chamber and at least one control valve that alternately opens the needle control chamber to a source of high pressure fluid or a low pressure passage. Each injector also has an actuation fluid inlet, an actuation fluid drain and a fuel supply passage. A source of fuel is connected to the fuel supply passage of each injector. A source of high pressure actuation fluid is connected to the actuation fluid inlet of each injector. A low pressure reservoir is connected to the actuation fluid drain of each injector. Finally, a computer is in communication with and capable of controlling each of said at least one control valve.

In still another embodiment, the present invention comprises a method of fuel injection that includes an initial step of providing a hydraulically actuated fuel injector having a nozzle outlet that opens to a nozzle chamber in which a needle valve reciprocates. The needle valve has a closing hydraulic surface exposed to pressure in the needle control chamber, and the injector also has at least one control valve that alternately opens the needle control chamber to a source of high pressure fluid or a low pressure passage. Next, fuel is hydraulically pressurized in the nozzle chamber to an injection pressure. The needle valve is then moved to an opened position to open the nozzle outlet to the nozzle chamber at least in part by opening the needle control chamber to the low pressure passage with the at least one control valve. Next, the needle valve is moved to its closed position to close the nozzle outlet to the nozzle chamber at least in part by opening the needle control chamber to the source of high pressure fluid with the at least one control valve.

BEST MODE FOR CARRYING OUT THE INVENTION

Figure 1:
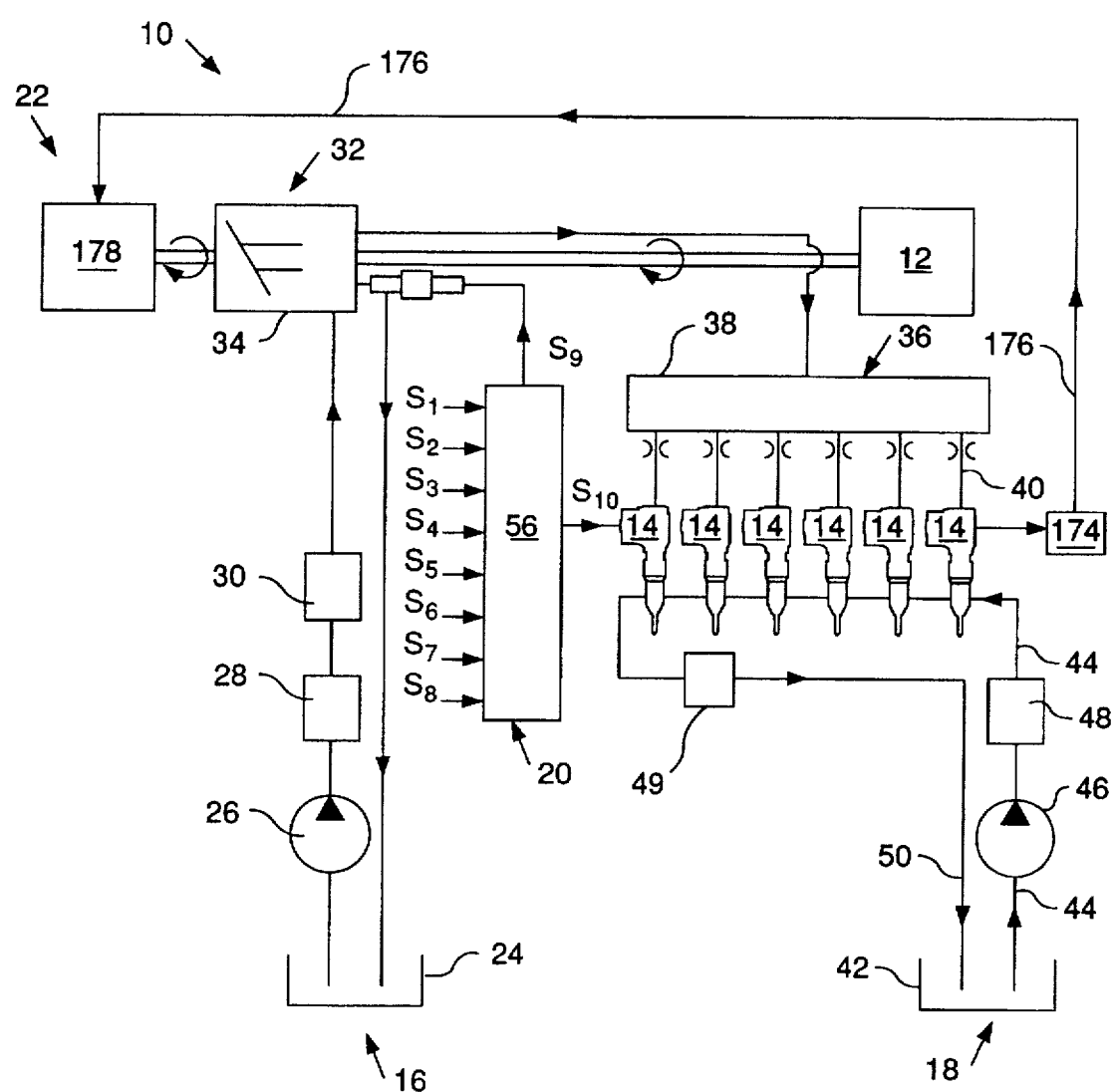
FIG. 1 is a schematic view of a hydraulically-actuated electronically-controlled fuel injection system according to the present invention.
Figure 2:
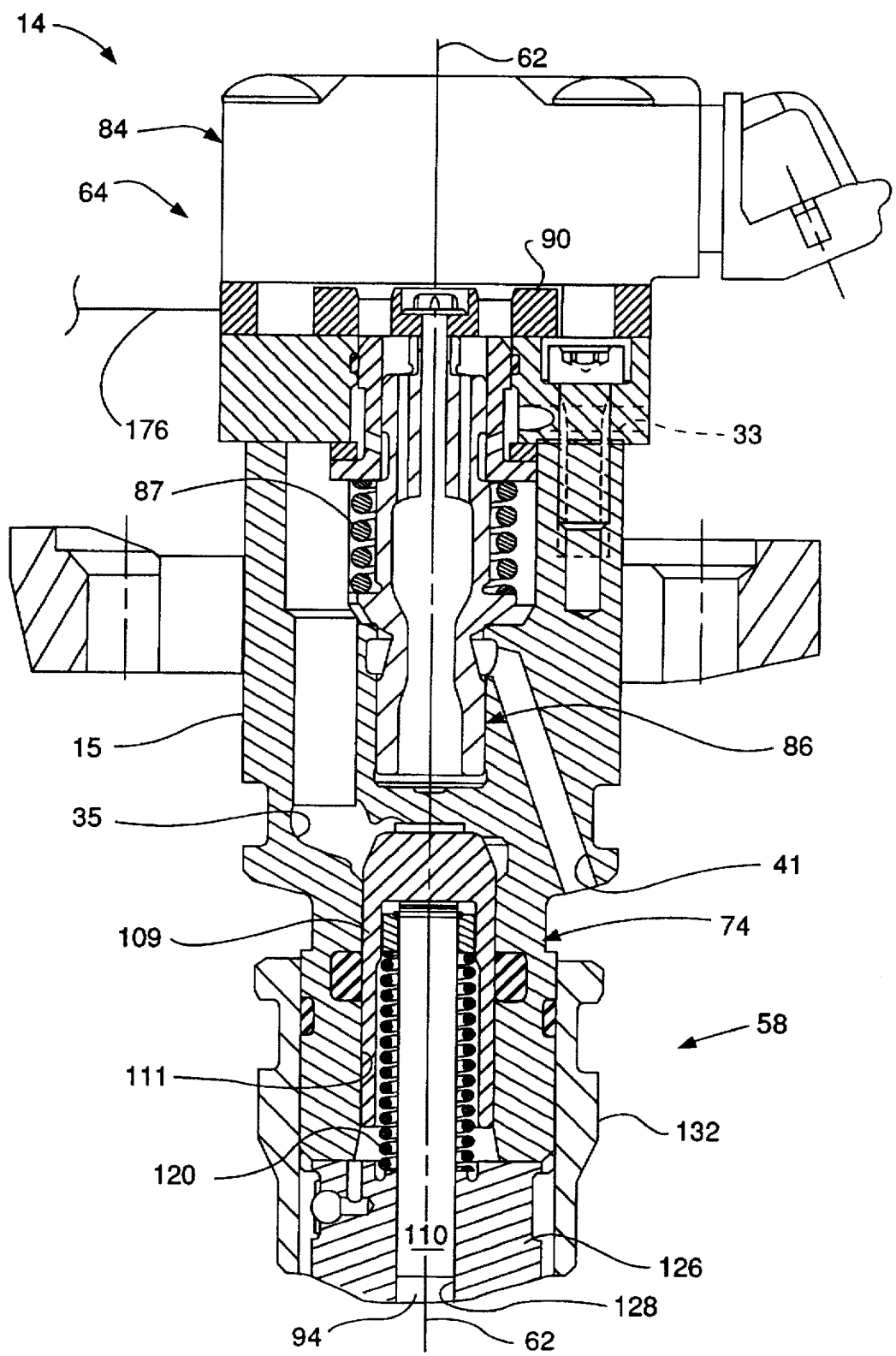
FIG. 2 is a partial sectioned side elevational view of an upper portion of one of the fuel injectors shown in FIG. 1.
Figure 3:
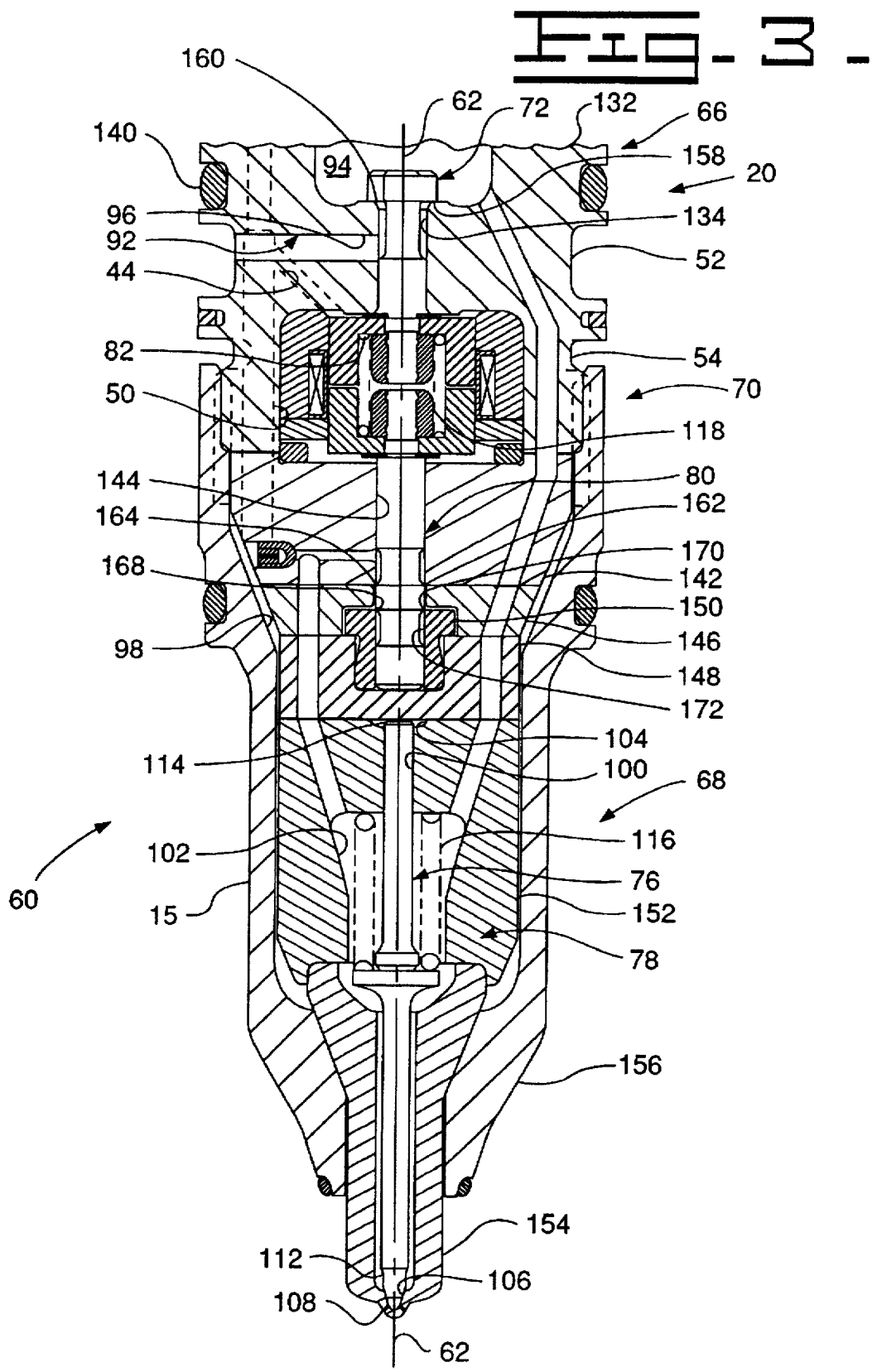
FIG. 3 is a partial sectioned side elevational view of a lower portion of one of the injectors shown in FIG. 1.

Referring now to FIGS. 1-3, wherein similar reference numerals designate similar elements or features throughout the Figs., there is shown an embodiment of a hydraulically-actuated electronically-controlled fuel injection system 10 (hereinafter referred to as a HEUI-B fuel system). The exemplary HEUI-B fuel system 10 is shown in FIG. 1 as adapted for a direct-injection diesel-cycle internal combustion engine 12.

The HEUI-B fuel system 10 includes one or more hydraulically-actuated electronically-controlled injectors 14, such as unit fuel injectors, each adapted to be positioned in a respective cylinder head bore of the engine. The system 10 further includes apparatus or means 16 for supplying hydraulic actuating fluid to each injector 14, apparatus or means 18 for supplying fuel to each injector 14, apparatus or means 20 for electronically controlling the fuel injection quantity, injection timing, pilot injection, multiple injections, post injection, variations in initial rise rate of pressures, and other variables known to those skilled in the art regarding fuel injection and/or actuating fluid pressure of the HEUI-B fuel system 10 independent of engine speed and load, and apparatus or means 22 for recirculating or recovering hydraulic energy of the hydraulic actuating fluid supplied to the injectors 14.

The hydraulically-actuating fluid supplying means 16 preferably includes an actuating fluid sump 24, a relatively low pressure actuating fluid transfer pump 26, an actuating fluid cooler 28, one or more actuating fluid filters 30, a source or means 32 for generating relatively high pressure actuating fluid (such as, for example, a relatively high pressure actuating fluid pump 34), and at least one relatively high pressure actuating fluid manifold 36.

Although the fluid chosen for the actuation fluid could be fuel, other available engine fluids could be used. In the preferred embodiments, the actuating fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid may be fuel provided by a fuel tank 42 or another source, such as coolant fluid, etc.

Preferably, one actuating fluid manifold 36 is provided for and associated with each cylinder head having a bank of injectors 14. Each actuating fluid manifold 36 has one common rail passage 38 and a plurality of rail branch passages 40 extending from the common rail passage 38.

The common rail passage 38 is arranged in fluid communication with the outlet from the relatively high pressure actuating fluid pump 34. The number of rail branch passages 40 for each manifold 36 corresponds to the number of injectors 14 positioned in each cylinder head. Each rail branch passage 40 is arranged in fluid communication between the common rail passage 38 and an actuating fluid inlet of a respective injector 14.

The fuel supplying means 18 preferably includes a fuel tank 42, a fuel supply passage 44 arranged in fluid communication between the fuel tank 42 and a fuel inlet of each injector 14, a relatively low pressure fuel transfer pump 46, one or more fuel filters 48, a fuel supply regulating valve 49, and a fuel circulation and return passage 50 arranged in fluid communication between the injector(s) 14 and the fuel tank 42. Preferably, each cylinder head defines an internal fuel supply passage 44 which communicates with an annular fuel inlet 52 of each injector 14 associated with the respective cylinder head. Preferably, each cylinder head also defines a separate internal fuel drain passage 50 which communicates with a fuel outlet 54 of each injector 14 associated with the respective cylinder head. Alternatively, the fuel supply passage 44 and the fuel drain passage 50 defined in the cylinder head may be a single internal passage. Alternatively, the passages 44,50 may be a single or pair of external lines positioned outside of cylinder head. Optionally, a sleeve (not shown) may be sealedly positioned in the injector bore radially between the injector 14 and the cylinder head to separate internal coolant chambers of the cylinder head from the injector 14.

The electronic controlling means 20 or apparatus preferably includes an electronic control module 56 (computer) which controls 1) the fuel injection timing, 2) the total fuel injection quantity during an injection cycle, 3) the fuel injection pressure, 4) the number of separate injections or injection segments during an injection cycle, 5) the time interval(s) between the injection segment(s), 6) the fuel quantity of each injection segment during an injection cycle; and 7) any combination of the above parameter(s) between a plurality of injectors 14. Each of the above parameters are variably controllable independent of engine speed and load.

Preferably, each injector 14 is a unit injector having an injector body 15 wherein both a hydraulic fuel pressurization device 58 and a direct control fuel injection device 60 are housed in the same unit. Although shown here as a unitized injector 14, alternatively, the injector could be of a modular construction with the fuel injection device 60 positioned separate from hydraulic fuel pressurization device 58. The injector 14 includes an imaginary longitudinal centerline axis 62 for reference purposes.

The injector 14 includes an electrical actuator and valve assembly 64 operable to selectively communicate pressurized actuating fluid to the injector 14 in response to receiving one or more variably-selected electronic control signals $S_{10}$ during an injection cycle. The injector further includes a housing portion 66, a nozzle portion 68, an electrical actuation means or device(s) 70, an electronically-controlled first pressure control valve 72, a reciprocal fuel intensification and pressurization member 74, a direct-operated needle valve 76, a first biasing device 78, an electronically-controlled second pressure control valve 80, and a second biasing device 82. Valve 80 can also be identified as a needle control valve.

The actuator and valve assembly 64 includes an actuator 84, preferably in the form of a solenoid assembly, and a control valve 86, preferably in the form of a poppet or spool valve. The solenoid assembly 84 includes a fixed stator or coil assembly (not shown) and a movable armature 90. Control valve 86 is biased via coil biasing spring 87 to close actuation fluid inlet 41 and open actuation fluid drain 33 to actuation fluid cavity 35. Preferably, the actuator and valve assembly 64, as well as the intensification and pressurization member 74, incorporate other features or improvements disclosed in U.S. Pat. No. 5,271,371 issued to Meints et al. on Dec. 21, 1993.

The housing portion 66 defines a fuel control passage 92 and an integral fuel pressurization chamber 94. The internal fluid volume of the fuel pressurization chamber 94 is preferably fixed and sized depending upon, inter alia, the desired maximum fuel quantity injected during an injection cycle, the desired peak fuel injection pressure during an injection cycle, the desired fuel injection pressure decay or drop during an injection cycle, the bulk modulus of the fuel, and the displacement of the member 74 (i.e., stroke and effective area). The control passage 92 generally refers to either a relatively-low pressure fuel supply passage 96 or a relatively-low pressure fuel drain passage 98 defined in injector body 15.

The electrical actuation means 70 is provided for controlling the positions of the first and second valves 72,80. The electrical actuation means 70 is selectively de-energized or energized. For example, the electrical actuation means 70 may include a single solenoid or a plurality of solenoids. Alternatively, the means 70 may include a piezoelectric device. The first valve 72 is preferably positioned in fuel pressurization chamber 94 and selectively movable between a first position, at which the electrical actuation means 70 is deenergized, and a second position at which the electrical actuation means 70 is either energized or de-energized as explained below. At its first position, the first valve 72 opens fluid communication between the fuel pressurization chamber 94 and the low pressure passage 96. The first valve 72 is energized to move from its first (opened) position to its second (closed) position. At its closed position, the first valve 72 blocks fluid communication between fuel pressurization chamber 94 and the low pressure passage 96. Preferably, one end portion of the first valve 72 includes an enlarged head positioned in the fuel pressurization chamber 94. Another portion of the first valve 72 includes a land positioned in the bore 134 of the housing 132. The outer periphery of the land includes one or more axially-extending flats or passages. The flats are arranged for communicating fuel, from the low pressure passage 96 to the electrical actuation means 70, for cooling and equalizing fluid pressures.

The nozzle portion 68 defines a bore 100, a nozzle chamber 102 integral with or arranged in fluid communication with fuel pressurization chamber 94, a needle control chamber 104 separate from the nozzle chamber 102 and fuel pressurization chamber 94, a tip seat 106, and at least one nozzle outlet 108.

In the embodiment shown, the intensification and pressurization member 74 preferably includes an intensifier piston 109 and a reciprocal plunger 110. Piston 109 is positioned to reciprocate in piston bore 111 between a retracted position, as shown, and an advanced position. The plunger 110 is positioned in the plunger bore 128 and is selectively movable between a first, retracted position and a second, advanced position. When the first valve 72 is opened (i.e., its first position), the plunger 110 is operable during movement from its first to second positions for displacing a first variably-selected volume of fuel from fuel pressurization chamber 94 to the low pressure passage 96. When the first valve 72 is closed (i.e., its second position) the plunger 110 is operable during movement from its first to second positions for displacing a second variably-selected volume of fuel in fuel pressurization chamber 94 thereby hydraulically pressurizing such fuel to a selected variable pressure. Stated differently, after the first valve 72 is closed, the plunger 110 compresses the fuel to a controlled volume which is less than the fixed volume. To maximize the injection pressure available at the start of injection, the solenoid assembly 84 is electrically energized preferably so that movement of the plunger 110 from its first to second positions begins before initial fuel injection begins in an injection cycle. This also provides a variably selected injection pressure at the beginning of injection.

In order to increase the mean effective injection pressure produced by the injector 14, the hydraulically-actuated plunger 110 continues moving from its first to second positions during initial fuel injection in an injection cycle. Alternatively, the solenoid assembly 84 can be electrically energized even earlier so that movement of the plunger 110 from its first position to a compressed position is completed prior to initial fuel injection during an injection cycle. Piston 109 and plunger 110 retract between injection events under the action of piston/plunger return spring 120.

The needle valve 76 is positioned in the bore 100 of the nozzle portion and selectively movable between a first position blocking fluid communication between the nozzle chamber 102 and the nozzle outlet 108 and a second position opening fluid communication between the nozzle chamber 102 and the nozzle outlet 108. The needle valve 76 has a first end portion 112 and a second end portion 114. The first end portion 112 defines an opening hydraulic surface area arranged in at least partial fluid communication with pressure within nozzle chamber 102 when the needle valve 76 is closed (i.e., its first position). The opening hydraulic surface area is arranged to be in complete fluid communication with the injection chamber 102 when the needle valve 76 is opened (i.e., its second position). The second end portion 114 defines a closing hydraulic surface area arranged in fluid communication so as to be exposed to pressure within needle control chamber 104. The first biasing device 78 preferably includes a first mechanical spring 116 operable for biasing the needle valve 76 towards its closed or first position. The needle valve 76 is illustrated as an inwardly-opening valve. Alternatively, the needle valve may be an outwardly-opening valve defining at least one injection orifice when it unseats from the tip seat, or a valve directly attached and driven by an actuator, such as a solenoid.

The second valve 80 is selectively movable between a de-energized first position and an energized second position. Preferably, the second valve 80 is a three-way valve such as a poppet valve or spool valve. The second valve 80 at its first position blocks fluid communication between the needle control chamber 104 and the low pressure passage 98 and opens fluid communication between the needle control chamber 104 and the nozzle chamber 102. The second valve 80 at its second position opens fluid communication between the needle control chamber 104 and the low pressure passage 98 and blocks fluid communication between the needle control chamber 104 and the nozzle chamber 102. When the needle valve 76 is closed and the second valve 80 is at its second position, the opening and closing hydraulic surface areas are operable for biasing the needle valve 76 towards its second (opened) position. When the needle valve 76 is at its second (opened) position and the second valve 80 is at its first position, the opening and closing hydraulic surface areas are operable for balancing opposing hydraulic forces thereby allowing the first biasing device 78 to move the needle valve 76 towards its first (closed) position.

The second biasing device 82 preferably includes a second mechanical spring 118 for biasing both the first and second valves 72,80 towards their respective first positions. Alternatively, the second biasing device 82 may be a plurality of springs biasing the respective first and second valves toward their respective first positions.

In the embodiment shown in FIGS. 2–3, the injector 14 also includes, inter alia, a barrel 126 defining a plunger bore 128 in which the plunger 110 reciprocates according to a predetermined tight clearance, a housing 132 connected to or integral with the barrel 126 and defining a bore 134 in which the first valve 72 reciprocates according to a relatively loose clearance, an optional sleeve (not shown) or hardened tubular insert sealedly positioned between the barrel 126 and the housing 132 and at least partially defining the fuel pressurization chamber 94, an electrical connector (not shown) electrically connected to the electrical actuation device 70, an upper seal 140, an upper stop 142 defining a bore 144 in which the second valve 80 reciprocates according to a predetermined tight clearance, a spacer 146, a lower stop 148, a poppet sleeve 150 positioned between the spacer 146 and the lower stop 148, a body 152 defining the bore 100 in which a portion of the needle valve 76 reciprocates according to a preselected tight clearance, a tip 154 which defines the tip seat 106 and the nozzle outlets 108, and a case 156 connected to the housing 132.

The housing 132 and first valve 72 each define a seat 158,160 which sealedly contact one another when the first valve 72 is closed. The upper stop 142 and second valve 80 each define a seat 162,164 which sealedly contact one another when the second valve 80 is at its second position. The poppet sleeve 150 and second valve 80 each define a separate seat 168,170 which sealedly contact one another when the second valve 80 is at its first position.

Preferably, the poppet sleeve 150 defines a bore 172 in which the second valve 80 reciprocates according to a predetermined tight clearance. Preferably, the poppet sleeve 150 is positioned between the spacer 146 and the lower stop 148. The poppet sleeve 150 also defines one or more separate control orifices which generally radially communicate between the bore 172 and the outer periphery of the poppet sleeve 150 and thence to the low pressure passage 98.

Preferably, the electrical actuation device 70 is connected to the housing 132. The upper stop 142, spacer 146, lower stop 148, body 152, and tip 154 are retained between the case 156 and the housing 132.

In the FIGS. 2-3 embodiment, the actuator and valve assembly 64 is positioned collinear with the axis 62. Alternatively, the actuator and valve assembly 64 may be positioned at an angle (for example 90°) relative to the axis 62 or even separate from the injector 14.

The hydraulic energy recirculating or recovering means 22 preferably includes a waste actuating fluid control valve 174 for each injector 14, a common recirculation line 176 connected to each valve 174, and a hydraulic motor 178 connected between the actuating fluid pump 34 and the recirculation line 176. Preferably, each control valve 174 is a solenoid control valve selectively activated by the ECM 56. The control valve 174 opens after injection of the respective injector 14 is completed and closes after the fluid pressure is communicated to recirculation line 176 and hydraulic motor 178. Preferably, the hydraulic motor 178 has a rotatable output shaft which is adapted to rotatably drive the drivetrain of the engine 12.

Figure 4:
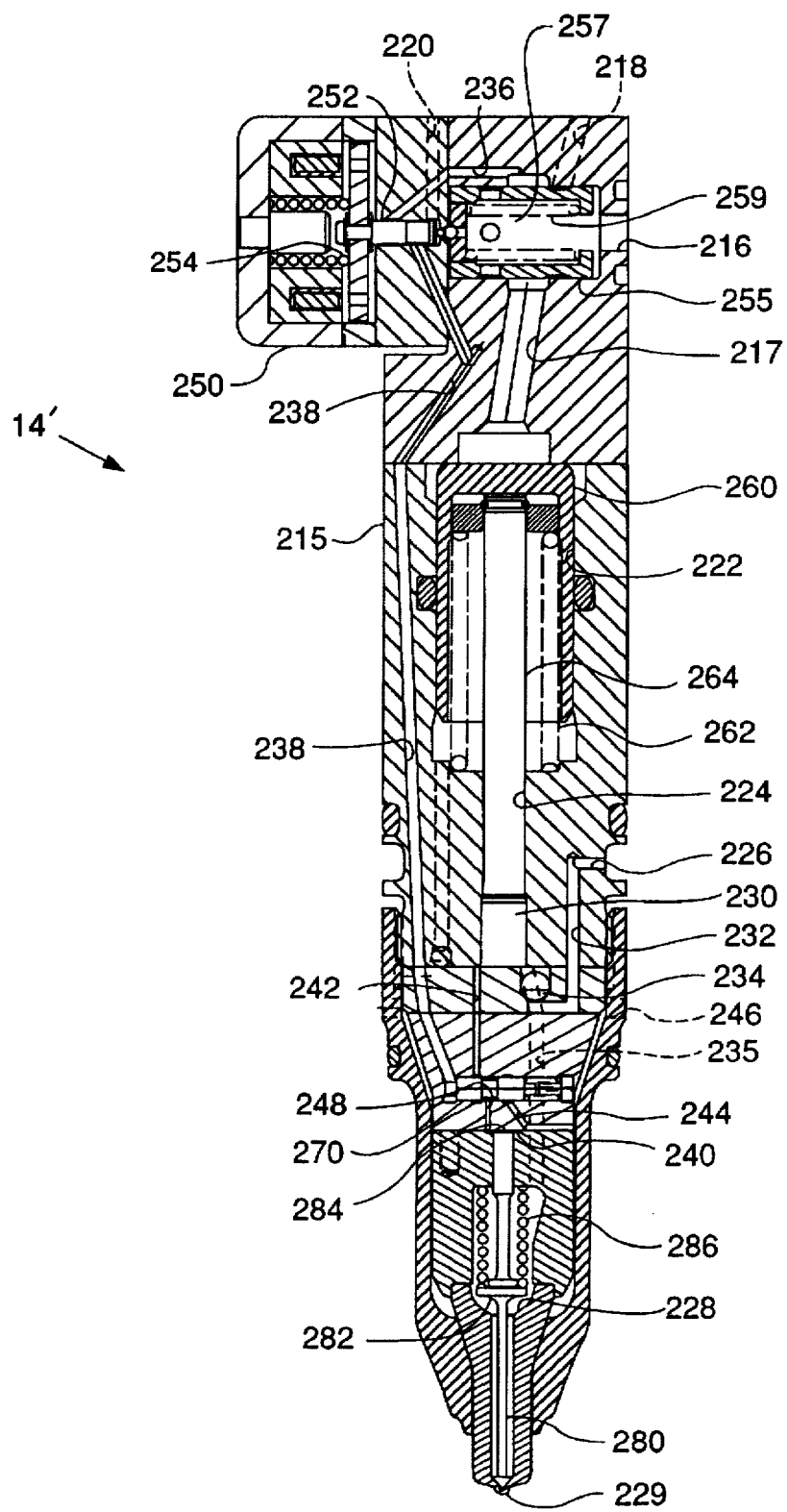
FIG. 4 is a sectioned side elevational view of a fuel injector according to another embodiment of the present invention.
Figure 5:
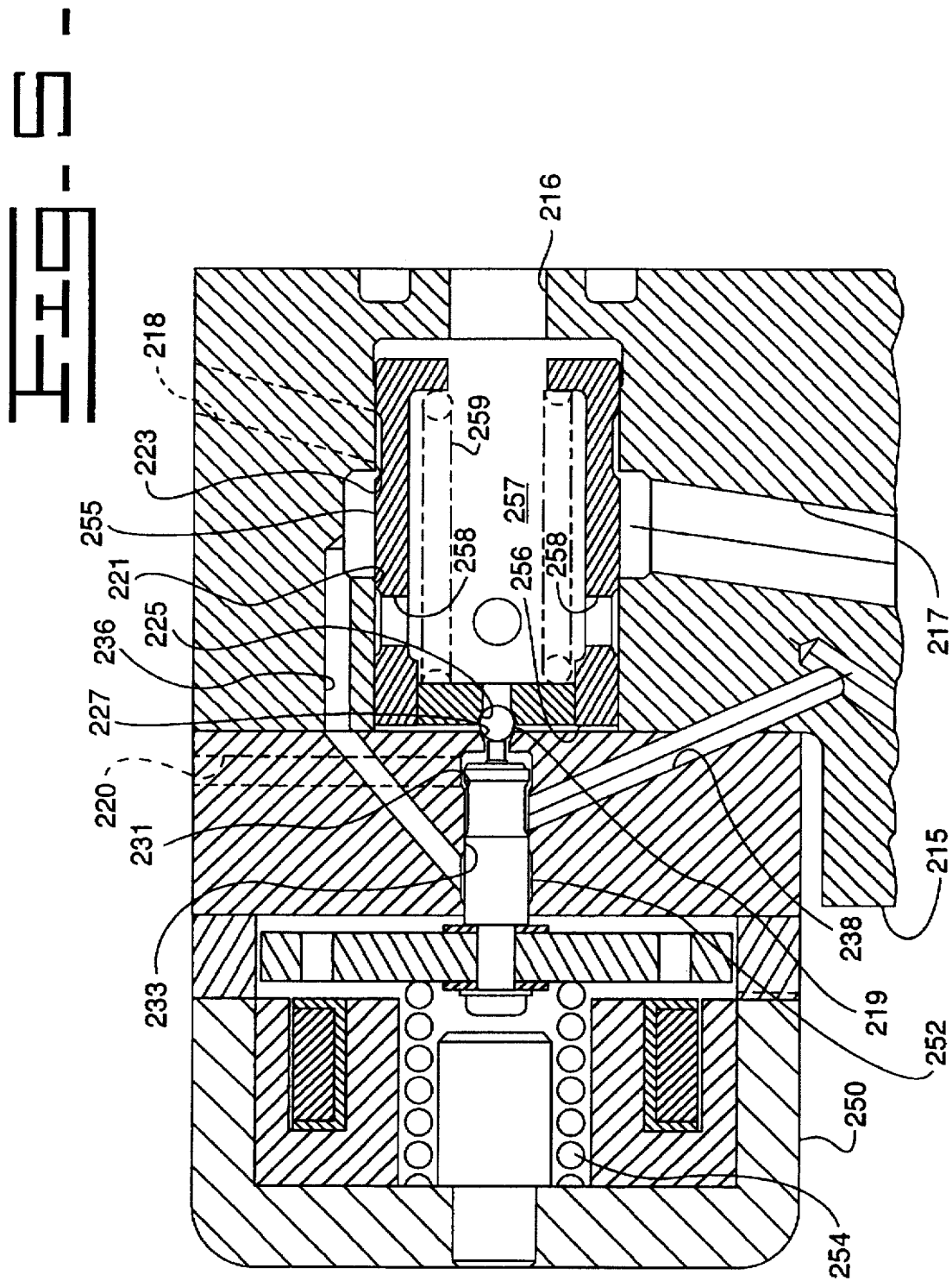
FIG. 5 is an enlarged partial sectioned side elevational view of an upper portion of the fuel injector shown in FIG. 4.
Figure 6:
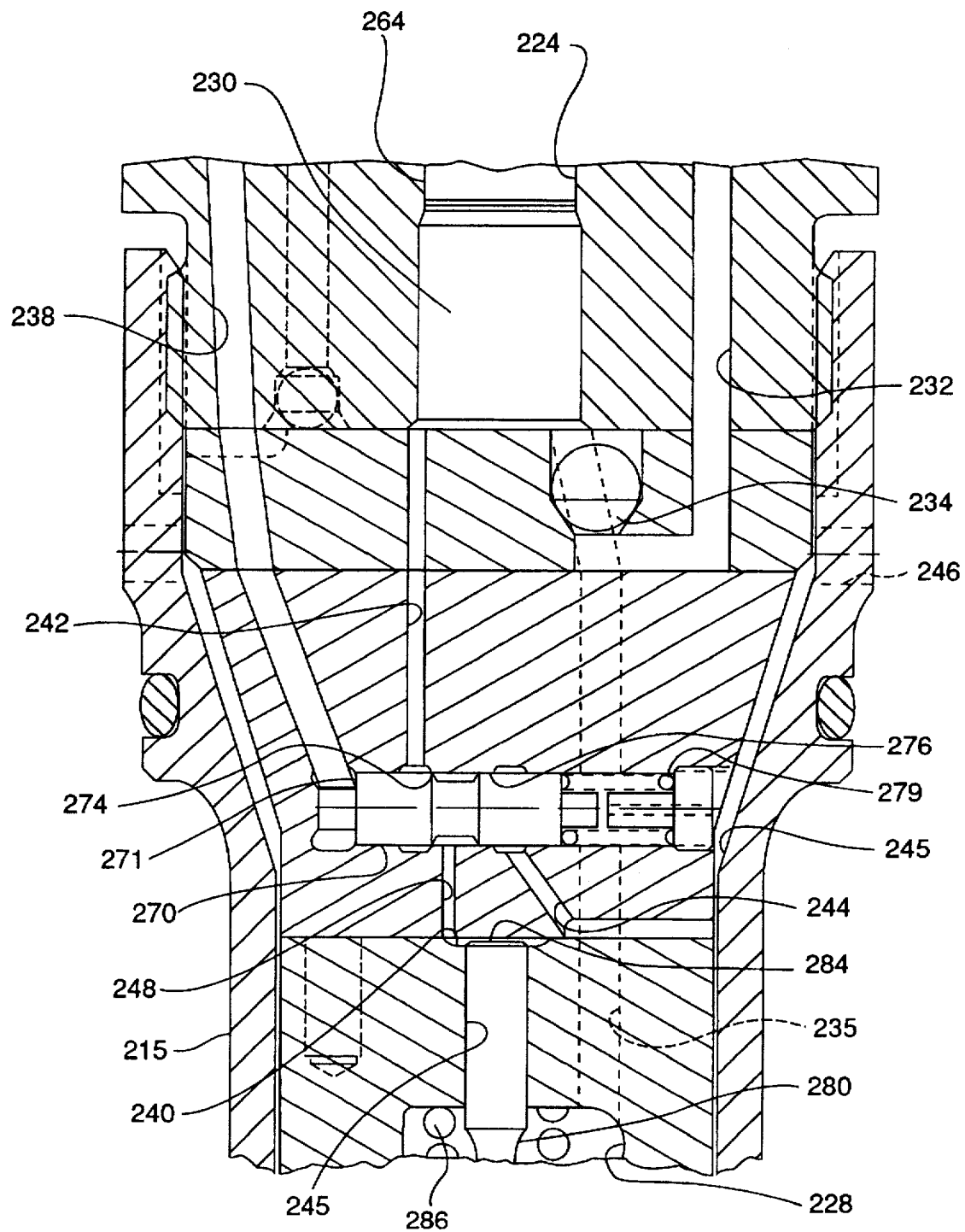
FIG. 6 is an enlarged partial sectioned side elevational view of a lower middle portion of the fuel injector shown in FIG. 4.

Referring now to FIGS. 4-6, a second embodiment of a HEUI-B fuel injector 14' is shown. Fuel injectors 14' could be substituted for the fuel injectors 14 shown in FIG. 1. This embodiment differs from the previous embodiment by the inclusion of a three position control valve driven by a single solenoid, rather than a pair of two position control valves controlled by two solenoids, as in the previous embodiment. Thus, one solenoid is eliminated but the second embodiment retains the direct control needle valve feature of the previous embodiment.

Fuel injector 14' shares many features in common with fuel injector 14 of the previous embodiment, especially in the way the two fuel injectors hydraulically pressurize fuel. Injector 14' includes an injector body 215 having a plunger bore 224 and an actuation fluid cavity 217 that opens to a high pressure actuation fluid inlet 216, a low pressure actuation fluid drain 218 and a piston bore 222. A sleeve valve member 255 is biased by a compression spring 259 from a closed position, as shown, toward an open position. When sleeve valve member 255 is in its closed position as shown, actuation fluid cavity 217 is closed to high pressure actuation fluid inlet 216, but open to low pressure actuation fluid drain 218. When sleeve valve member 255 moves under the action of compression spring 259 to its opened position, actuation fluid cavity 217 is opened to actuation fluid inlet 216 and closed to drain 218. The position of sleeve valve member 255 is controlled by a three position solenoid 250 that is capable of moving an actuation valve member 252 between a first position, a second position and a third position against the action of compression spring 254. When the solenoid 250 is de-energized, as shown, compression spring 254 pushes actuation valve member 252 to its first position in which actuation fluid cavity 217 is open to drain 218 and actuation fluid control passage 238 is open to a second low pressure actuation fluid drain 220.

When solenoid 250 is energized with a full or pull-in current, actuation control valve member 252 is pulled to the left against its stop to a second position. When this occurs, sleeve valve member 255 becomes hydraulically balanced and moves to its open position under the action of compression spring 259. At the same time, actuation valve member 252 opens actuation fluid control passage to a transfer passage 236 which opens to the high pressure in actuation fluid cavity 217, and closes control passage 238 to drain 220. When solenoid 250 is energized with a medium or hold-in current, actuation valve member 252 moves slightly to the right a sufficient distance to close actuation fluid control passage 238 to the high pressure in transfer passage 236 and reopens the same to low pressure drain 220. However, the hold-in current is not sufficient to cause any change in the position of sleeve valve member 255, which remains in its open position with actuation fluid cavity 217 open to high pressure inlet 216.

In this embodiment, sleeve valve member 255 can be thought of as an actuation fluid control valve; however, those skilled in the art will appreciate that by rearranging various passageways, actuation valve member 252 and sleeve valve member 255 could be merged into a single spool valve member.

An intensifier piston 260 is positioned to reciprocate in piston bore 222 between a forward position and a return position, as shown. A plunger 264 is positioned to reciprocate in plunger bore 224 between a retracted position, as shown, and an advanced position. Intensifier piston 260 and plunger 264 are biased via a compression spring 262 to their respective return and retracted positions. A portion of plunger bore 224 and plunger 264 define a fuel pressurization chamber 230 that is open to a nozzle chamber 228 via a nozzle supply passageway 235 that is hidden in this section view. Nozzle chamber 228 in turn opens to a nozzle outlet 229, which opens to the engine's combustion chamber.

A needle valve 280 is mounted within nozzle chamber 228 and is capable of moving between a closed position, as shown, in which nozzle chamber 228 is closed to nozzle outlet 229, and an opened position in which nozzle chamber 228 is open to nozzle outlet 229. One end of needle defines a closing hydraulic surface 284 that is open and exposed to fluid pressure within needle control chamber 240. Nozzle chamber 228 is isolated from needle control chamber 290 by the relatively tight clearance in bore 245. Needle control chamber 240 and its connection passage 248 are alternately open to a source of high pressure fluid or a low pressure passage by a needle control valve 270 that is mounted within injector body 215. Needle control valve 270 is moveable between an off position in which needle control chamber 240 is opened to high pressure in fuel pressurization chamber 230 via a connection passage 242 and an on position in which needle control chamber 240 is opened to a low pressure passage 244. The on or off positioning of needle control valve 270 is controlled by the pressure within actuation fluid control passage 238.

Needle valve 280 includes an opening hydraulic surface 282 that is exposed to pressure within nozzle chamber 228. Closing hydraulic surface 284 and opening hydraulic surface 282 are sized and arranged such that needle valve 280 is biased toward its closed position when needle control chamber 240 is opened to fuel pressurization chamber 230. This biasing can be caused by a hydraulic imbalance in needle valve 280 due to the relative sizing of the hydraulic surfaces and/or the action of a compression return spring 286. Compression spring 286 biases needle valve 280 toward its closed position when pressure in nozzle chamber 228 is below a valve opening pressure and needle control chamber 240 is opened to low pressure passage 244. Needle valve 280 is biased toward its open position when needle control chamber 240 is opened to low pressure passage 244 and the fuel pressure within nozzle chamber 228 is greater than a valve opening pressure sufficient to overcome compression spring 286.

Referring now to FIG. 5, an enlarged view of the actuation valve area of fuel injector 14' is shown in order to better explain the positioning and plumbing associated with the actuation fluid. Sleeve valve member 255 includes a hollow interior 257, opposing hydraulic end surfaces and a plurality of radial openings 258. When solenoid 250 is deenergized, compression spring 254 pushes actuation valve member 252 toward the right, which in turn pushes ball valve 219 against seat 225. This exposes end hydraulic surface 256 of sleeve valve member 255 to the low pressure of actuation fluid drain 220. High pressure actuation fluid from inlet 216 acts on the other end of sleeve valve member 255 pushing it toward its closed position, as shown, in which seat 221 is closed but seat 223 is open. In this position, the fluid in actuation fluid cavity 217 is low since it is open to low pressure actuation fluid drain 218 past seat 223. Also when solenoid 250 is deenergized, actuation fluid control passage 238 is opened to low pressure actuation fluid drain 220 past a seat 231.

When solenoid 250 is fully energized with a pull-in current, actuation spool valve member 252 is moved to the left closing seat 231 as seat 233 opens actuation fluid control passage 238 to the pressure within transfer passage 236. At the same time, the high pressure actuation fluid within hollow interior 257 moves ball valve 219 from seat 225 to seat 227. This in turn allows actuation fluid to flow around behind sleeve valve member 255 to act upon end hydraulic surface 256 which renders sleeve valve 255 hydraulically balanced. Sleeve valve member 255 then moves to the right under the action of compression spring 259 to close seat 223 and open seat 221. When this occurs, high pressure actuation fluid flows into actuation fluid cavity 217 and transfer passage 236 via the radial openings 258 in sleeve valve member 255.

Referring now to FIG. 6, the direct needle control valve aspects of this embodiment of the present invention are enlarged for clarity. Needle control valve 270 includes a direct control valve member 272 having a hydraulic pressure surface 271 opening to actuation fluid control passage 238. Hydraulic pressure surface 271 is positioned on one end so as to produce a hydraulic force on the direct control valve member toward its on position in which needle control chamber 240 is opened to a low pressure passage 244 via connection passageway 248 and past seat 276. A compression spring 279 normally biases needle control valve 270 toward its off position in which needle control chamber 240 is opened to fuel pressurization chamber 230 via connection passages 248 and 242, and past seat 274.

Low pressure fuel is supplied to injector 14' through an opening 226 (see FIG. 4) which opens to a fuel supply passage 232. When plunger 264 is retracting, fuel flows into fuel pressurization chamber 230 past ball check 234 which is positioned in fuel supply passage 232. Low pressure passage 244 opens to an internal passage 245 which connects to a return opening 246, for recirculation to another injector.

Figure 7:
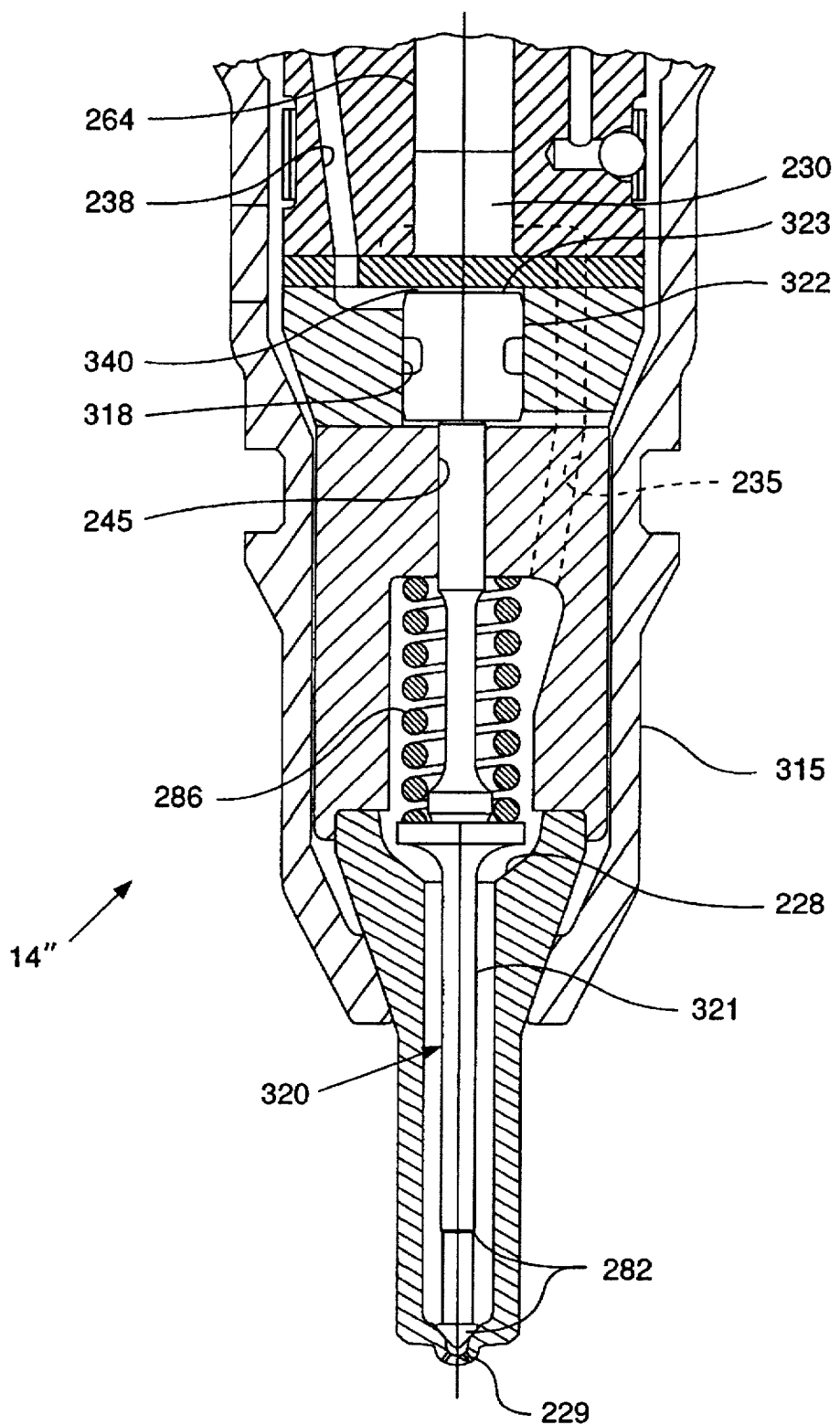
FIG. 7 is a partial sectioned side elevational view of a lower portion of an injector according to another embodiment of the present invention.

Referring now to FIG. 7, a portion of still another injector 14" is shown as a variation on the injector 14' illustrated in FIGS. 4–6. In particular, injector 14" is substantially identical to injector 14' described earlier, except that the direct control valve member 272 is eliminated in this later embodiment such that closure of the needle valve is accomplished by the direct application of actuation fluid pressure to the hydraulic closing surface 323 of the needle valve 320. In the injector 14', actuation fluid pressure moves a valve 270 that exposes the hydraulic closing surface to high or low pressure fuel. The upper portion of injector 14" is substantially identical to that of injector 14', and the reader is referred to FIG. 5 and its accompanying disclosure for a description of these features of both embodiments.

Injector 14" includes an injector body 315 that defines an internal passage 245 and a needle intensifier bore 318. In this embodiment needle valve 320 includes a needle portion 321 and an end portion 322. End portion 322 functions as a piston that intensifies the actuation fluid pressure force on needle valve 320. These two portions of needle valve 320 are machined from separate pieces; however, those skilled in the art will appreciate that needle portion 321 and end portion 322 could be machined from a single integral piece of a suitable material. Needle valve 320 is capable of moving within nozzle chamber 228 between a closed position in which nozzle outlet 229 is closed and an open position in which the nozzle outlet is open. Needle valve 320 includes at least one opening hydraulic surface 282 exposed to fluid pressure within nozzle chamber 228, and a closing hydraulic surface 323 that is exposed to pressure within needle control chamber 340. It should be pointed out that needle control chamber 340 is always isolated from fuel pressurization chamber 230. Needle control chamber 340 is always in direct fluid communication with an actuation fluid control passage 238, as described earlier in relation to FIGS. 4–6.

In this embodiment, actuation spool valve member 252 functions as a needle control valve since it alternately opens actuation fluid control passage 238 to high pressure actuation fluid inlet 216 or a low pressure actuation fluid drain 220 (see FIG. 5). The opening hydraulic surface 282 and the closing hydraulic surface 323 are sized and arranged so that needle valve 320 is biased to a closed position when needle control chamber 340 and actuation fluid control passage 238 are open to a source of high pressure fluid, i.e. actuation fluid inlet 216. When actuation fluid control passage 238 is opened to low pressure drain 220, needle valve 320 is biased to its closed position by the action of return spring 286. When fuel pressure within nozzle chamber 228 is above a valve opening pressure and needle control chamber 340 is open to low pressure drain passage 220, needle valve 320 will lift and open against the action of spring 286 to open nozzle outlet 229. Thus, this embodiment functions similar to the previous embodiment but eliminates direct control valve member 272 of the previous embodiment so that actuation fluid is used to directly apply hydraulic forces to the needle valve.

Industrial Applicability

Referring back to the injectors of FIGS. 2–3, before an injection cycle begins, the electrical actuation device 70 or solenoid is normally deenergized so that the first valve 72 is opened and the second valve 80 is at its first position. The needle valve 76 is at its first (closed) position. The opened first valve 72 allows the fuel pressurization chamber 94 and the nozzle chamber 102 to be filled with relatively low pressure fuel provided by the low pressure passage 96.

The plunger 110 is hydraulically driven downwardly by pressurized hydraulically-actuating fluid selectively provided to the actuation fluid cavity 35 and intensifier piston 109 after electrical actuation of the actuator 84. The plunger 110 begins its stroke from its retracted or first position. At a selected amount of plunger stroke, the solenoid 70 is energized causing closure of the first valve 72, movement of the second valve 80 to its second position, and compression of the second spring 118. The solenoid 70 preferably remains energized until the fuel pressure in the fuel pressurization chamber 94 reaches a level sufficient to hydraulically hold the first valve 72 closed. The solenoid 70 is then deenergized allowing the compressed second spring 118 to return the second valve 80 to its first position. The fuel pressure in the fuel pressurization chamber 94 and the nozzle chamber 102 continues to increase to a variably selected pressure due to continued stroking of the plunger 110. With the second valve 80 at its first position, high pressure fuel communicates with the needle control chamber 104 from the nozzle chamber 102 between opened seats 162,164. With the needle valve 76 seated, the closing hydraulic surface area exposed to high fuel pressure is greater than the opening hydraulic surface area thereby preventing the needle valve 76 from opening.

To start injection, the solenoid 70 is again energized thereby moving the second valve 80 to its second position and again compressing the second spring 118. This closes seats 164,162 of the second valve and upper stop. This also opens seats 170,168 of the second valve 80 and the poppet sleeve 150 communicating the needle control chamber 104 with the low pressure passage 98. By reducing the pressure in the needle control chamber 104 and having high pressure in the injection chamber 102, the needle valve 76 opens to begin fuel injection through the nozzle outlet 108 and into the engine combustion chamber (not shown).

To end fuel injection, the solenoid 70 is again de-energized, allowing the compressed second spring 118 to return the second valve 80 back to its first position and closing seats 170,168 of the second valve 80 and the poppet sleeve 150 to block fluid communication between the needle control chamber 104 and the low pressure passage 98. Moreover, seats 164,162 of the second valve 80 and the upper stop 142 are opened communicating the needle control chamber 104 with the nozzle chamber 102 thereby introducing high pressure fuel back into the needle control chamber 104.

Preferably, the opening and closing hydraulic surface areas of the needle valve 76 are sized and arranged such that when the needle valve 76 is opened and the second valve 80 is at its first position, the net hydraulic forces acting on the needle valve 76 are effectively zero. In other words, the net opposing fluid pressures are equal and also the opening and closing hydraulic surface areas on which such pressures act are equal. When the needle valve 76 is opened, the force of the first spring 116 is preferably the only unbalanced force acting on the needle valve 76, consequently biasing the needle valve 76 toward its first (closed) position. At the end of a fuel injection cycle or injection segment, the force of the first spring 116 urges the needle valve 76 from its opened position to its closed position at a selected velocity. The first spring force is preferably chosen to be sufficiently high for adequate check response yet sufficiently low to gently move the needle valve 76 toward the tip seat 106 so that the needle valve 76 does not overstress the tip 154 upon initial contact. Advantageously, the end of fuel injection during an injection cycle or segment is more precisely controlled since the velocity of the needle valve 76 in the closing direction is primarily determined only by the force of the first spring 116 with minimal affect by the fuel injection pressure.

Referring now to the fuel injector 14' illustrated in FIGS. 4-6, each injection sequence is started by applying pull-in current to solenoid 250 in order to move actuation spool valve member 252 to the left. Oil pressure that entered the injector and was trapped at seat 225 is now able to push ball valve 219 to seat 227. High pressure oil can flow past seat 225 through cross grooves in the back side of sleeve valve member 255 to act on end hydraulic surface 256. The sleeve valve member 255 is now pressure balanced and spring 259 moves it to the right. This opens seat 221 and closes seat 223. The main oil supply can flow through radial openings 258, past seat 221, into actuation fluid cavity 217 to the top of intensifier piston 260, starting it moving downward. Oil is also flowing through a connection passage 236 to the actuation spool valve member 252. Oil pressure on the hydraulic pressure surface 271 of needle control valve 270 moves the direct control valve member 272 to the right closing seat 274 and opening seat 276. With intensifier piston 260 and plunger 264 moving downward, fuel pressure starts to build within fuel pressurization chamber 230, closing ball check 234. If the solenoid pull-in current remains on, fuel pressure within nozzle chamber 228 will build via its connection passage 235 to fuel pressurization chamber 230 until a valve opening pressure (VOP) is reached and the needle valve opens against the action of needle return spring 286.

In order to provide direct control of needle valve 280, the solenoid pull-in current is reduced to its hold-in current before fuel pressure reaches VOP. By providing two force levels from the solenoid (pull-in and hold-in) a different injection characteristic takes place. Dropping back to a hold-in current from the initial pull-in current causes the actuation spool valve member 252 to close seat 233 and open seat 231. Hold-in current will provide enough force to prevent the solenoid spring from pushing ball valve 219 off of seat 227. The high pressure oil can no longer flow past seat 233 into actuation fluid control passage 238 to pressurize needle control valve 270 toward its on position. Instead, the pressurized oil acting on the hydraulic pressure to surface 271 of needle control valve 270 can flow past seat 231 which is open to low pressure actuation fluid drain 220. Releasing this pressurized oil allows the compression spring 279 to push needle control valve 270 to the left, opening seat 274 and closing seat 276.

Fuel pressure continues to build from the intensifier piston 260 and plunger 264 moving downward (or stopped at a point where the fuel is fully compressed rendering the plunger hydraulically locked), but the needle valve 280 will not open because high pressure fuel is allowed to flow from fuel pressurization chamber 230, through connection passage 242, past seat 274, into connection passage 248 and eventually to needle control chamber 240 to act on closing hydraulic surface 284 of needle valve 280. This pressure on needle valve 280 provides a force required to keep it closed. To open needle valve 280, solenoid 250 changes from hold-in current to its increased pull-in current. This allows high pressure oil to return to the hydraulic pressure surface 271 of needle control valve 270 moving the direct control valve member to the right closing seat 274 and opening seat 276. High pressure fuel can no longer flow past seat 274 to pressurize the closing hydraulic surface 284 of needle valve 280. The pressurized fuel on the needle valve can now flow past seat 276 which is open to low pressure passage 244. This removes the force keeping the needle valve closed, and now it opens allowing fuel to exit nozzle chamber 228 through nozzle outlet 229. Fuel injection can be paused or temporarily halted by returning the solenoid current to its hold-in level. This repressurizes the closing hydraulic surface 284 of needle valve 280 causing it to close. This direct control needle valve 280 allows the nozzle outlet to be opened and closed any number of times during each injection cycle.

To end injection and allow the injector to refuel itself for the next cycle, the solenoid 250 is de-energized. This causes actuation spool valve member 252 to close seat 233 and open seat 231. This releases the pressurized oil acting on needle control valve 270. The solenoid spring 254 causes the actuation valve member 252 to push ball valve 219 from seat 227 back to seat 225. The high pressure oil supply is closed off at seat 225, oil pressure on the hydraulic end surface 256 of sleeve valve member 255 is released past seat 227 to low pressure drain 220. Sleeve valve member 255 is again pressure biased causing it to move left against the action of spring 259 to close seat 221 and open seat 223. This releases pressurized oil acting on top of intensifier piston 260 by opening actuation fluid cavity 217 to low pressure drain 218 past seat 223. The intensifier piston 260 and plunger 264 are then returned upward by return spring 262. The lowering fuel pressure causes ball check 234 to open and replenish fuel in fuel pressurization chamber 230.

Changing the current levels from pull-in to hold-in creates true freedom for delivering fuel during the injection cycle. An injection characteristic tailored to specific engine operating conditions can be obtained. This injection system provides the ability to vary injection pressures by controlling the pressure of the actuation fluid and provides the ability to control injection characteristics through the direct control of the needle valve. The direct control of the needle valve allows the computer to control when the needle valve is opened at any pressure between valve opening pressure and a maximum injection pressure. This provides a significant amount of control over initial injection mass flow rate in order to produce some rate shaping, if desired. At the same time, the direct control aspects of the present invention allow for a desirable abrupt end to injection by providing the means by which the needle valve can be quickly closed at any desired time.

Referring now to the fuel injector 14" illustrated in FIG. 7, each injection event is initiated, controlled and ended in the same manner as injector 14' previously described. When needle control valve 252 (see FIG. 5) opens actuation fluid control passage 238 to the high pressure actuation fluid inlet 216, needle valve 320 is held closed because of the hydraulic force acting on closing hydraulic surface 323. After fuel within fuel pressurization chamber 230 and nozzle chamber 228 has been hydraulically pressurized to an injection pressure, each injection event is initiated by moving needle control valve 252 to open actuation fluid control passage 238 and needle control chamber 340 to a low pressure actuation fluid drain 220. This relieves pressure on closing hydraulic surface 323 allowing the needle valve 320 to open under the hydraulic force produced by pressurized fuel acting on opening hydraulic surface 282. Like the previous embodiment, injection is ended by again opening actuation fluid control passage 238 and needle control chamber 340 to high pressure actuation fluid inlet 216. Thus, the operation of injector 14" is substantially identical to the operation of injector 14' described earlier except that direct control valve member 272 has been eliminated in favor of allowing high and low pressure actuation fluid to act directly on the closing hydraulic surface of the needle valve.

The subject invention is capable of varying peak fuel injection pressure independent of engine speed and load. The subject invention is capable of variably controlling the fuel quantity of each separate fuel injection segment during an injection cycle. The subject invention is also capable of variably controlling each time interval between each separate fuel injection segment during an injection cycle. Moreover, the injector solenoid(s) can be energized and de-energized once or a selected plurality of times during an injection cycle to produce one or a variably-selected plurality of injection segments.

Moreover, the hydraulic energy recovering and reusing means 22 improves efficiency of operation of the HEUI-B fuel system 10. Rather than dumping used actuating fluid to the sump 24 following injection, the energy stored in such used pressurized actuating fluid is returned to the source 32 by directing it through the hydraulic motor 178. The hydraulic motor 178 converts hydraulic flow and pressure of the actuating fluid received from the injectors 14 into mechanical energy which rotatably drives the drivetrain of the engine 12. This arrangement provides improved brake specific fuel consumption (BSFC) or efficiency of the engine 12.

Other aspects, objects, and advantages of this invention can be obtained from a study of the drawings, the disclosure, and the appended claims.

We claim:

1. A hydraulically actuated fuel injector comprising:
   an injector body having a needle control chamber, a nozzle chamber and a nozzle outlet that opens to said nozzle chamber;
   hydraulic means, including said injector body having an actuation fluid cavity that opens to an actuation fluid inlet and an actuation fluid drain and an actuation fluid control valve mounted in said injector body and having a first position in which said actuation fluid cavity is open to said actuation fluid inlet and a second position in which said actuation fluid cavity is open to said actuation fluid drain, for pressurizing fuel in said nozzle chamber;
   a needle valve positioned to reciprocate in said nozzle chamber between an opened position in which said nozzle outlet is open and a closed position in which said nozzle outlet is closed, said needle valve including a closing hydraulic surface exposed to pressure in said needle control chamber;
   a needle control valve mounted within said injector body, and being movable between an off position in which said needle control chamber is opened to a source of high pressure fluid and an on position in which said needle control chamber is opened to a low pressure passage.

2. The fuel injector of claim 1 wherein said needle valve includes an opening hydraulic surface exposed to pressure in said nozzle chamber;
   said closing hydraulic surface and said opening hydraulic surface are sized and arranged such that said needle valve is hydraulically biased toward said closed position when said needle control chamber is opened to said source of high pressure fluid.

3. The fuel injector of claim 2 further comprising a spring in contact with said needle valve, for biasing said needle valve toward said closed position when pressure in said nozzle chamber is below a valve opening pressure and said needle control chamber is opened to said low pressure passage; and said needle valve is hydraulically biased toward said opened position when said needle control chamber is connected to said low pressure passage and pressure in said nozzle chamber is greater than said valve opening pressure.

4. The fuel injector of claim 3 wherein said hydraulic means for pressurizing further includes:

said injector body having a plunger bore and a piston bore;

an intensifier piston positioned to reciprocate in said piston bore between a forward position and a return position;

a plunger positioned to reciprocate in said plunger bore between a retracted position and an advanced position; and a portion of said plunger bore and said plunger define a fuel pressurization chamber that is open to said nozzle chamber.

5. The fuel injector of claim 3 wherein said source of high pressure fluid is a fuel pressurization chamber.

6. The fuel injector of claim 5 wherein said needle control valve includes a direct control valve member mounted to reciprocate in said injector body between an off position in which said needle control chamber is open to said fuel pressurization chamber and an on position in which said needle control chamber is open to said low pressure passage.

7. The fuel injector of claim 6 wherein said direct control valve member includes a hydraulic pressure surface opening to an actuation fluid control passage in said injector body and positioned to produce a hydraulic force on said direct control valve member toward said on position;

means, within said injector body, for biasing said direct control valve member toward said off position;

said actuation fluid control valve closes said actuation fluid control passage to said actuation fluid inlet when in said second position and said actuation fluid control passage is open to a low pressure drain when in said first position.

8. The fuel injector of claim 7 wherein said direct control valve member is a spool valve member.

9. The fuel injector of claim 3 wherein said source of high pressure fluid is said actuation fluid inlet.

10. The fuel injector of claim 9 wherein said needle valve includes a needle portion with an opening hydraulic surface exposed to pressure in said nozzle chamber and an end portion with a closing hydraulic surface exposed to pressure in said needle control chamber.

11. The fuel injector of claim 3 further comprising said actuation fluid control valve having a three position solenoid attached to an actuation valve member.

12. The fuel injector of claim 11 wherein said injector body includes an actuation fluid control passage that communicates actuation fluid pressure to said needle valve; and said actuation fluid control passage and said actuation fluid cavity being closed to said actuation fluid inlet when said actuation valve member is in said first position;

said actuation fluid control passage and said actuation fluid cavity being opened to said actuation fluid inlet when said actuation valve member is in said second position; and said actuation fluid control passage is closed to said actuation fluid inlet, and said actuation fluid cavity is opened to said actuation fluid inlet when said actuation valve member is in a third position.

13. The fuel injector of claim 12 wherein said actuation valve member is a spool valve member.

14. The fuel injector of claim 13 further comprising a sleeve valve member with a hollow interior and at least one radial flow opening, and being movable between an opened position and a closed position; and said hollow interior being open to said actuation fluid inlet.

15. The fuel injector of claim 14 wherein said hollow interior opens to an actuation fluid drain passage in said injector body;

a ball valve movable by said actuation valve member between a first position in which said actuation fluid drain passage is closed and a second position in which said actuation fluid drain passage is opened.

16. A fuel injection system comprising:

a plurality of hydraulically actuated fuel injectors with direct control needle valves, each injector having a needle valve with a closing hydraulic surface exposed to pressure in a needle control chamber and at least one control valve that alternately opens said needle control chamber to a source of high pressure fluid or a low pressure passage, and each injector also having an actuation fluid cavity, an actuation fluid inlet, an actuation fluid drain and a fuel supply passage and said at least one control valve including an actuation fluid control valve mounted in said injector body and moveable between a first position in which said actuation fluid cavity is open to said actuation fluid inlet and a second position in which said actuation fluid cavity is open to said actuation fluid drain;

a source of fuel connected to said fuel supply passage of each said injector;

a source of high pressure actuation fluid connected to said actuation fluid inlet;

a low pressure reservoir connected to said actuation fluid drain; and a computer in communication with and capable of controlling each of said at least one control valve.

17. The fuel injection system of claim 16 wherein said needle valve includes an opening hydraulic surface exposed to pressure in said nozzle chamber;

said closing hydraulic surface and said opening hydraulic surface of each said injector are sized and arranged such that said needle valve is hydraulically biased toward said closed position when said needle control chamber is opened to said source of high pressure fluid.

18. The fuel injection system of claim 17 further comprising means, including a spring in contact with said needle valve, for biasing said needle valve toward said closed position when pressure in said nozzle chamber is below a valve opening pressure and said needle control chamber is opened to said low pressure passage; and said needle valve is hydraulically biased toward said opened position when said needle control chamber is opened to said low pressure passage and pressure in said nozzle chamber is greater than said valve opening pressure.

19. The fuel injection system of claim 18 wherein each of said fuel injectors includes:

said injector body having a piston bore and a plunger bore;

an intensifier piston positioned to reciprocated in said piston bore between a forward position and a return position;

a plunger positioned to reciprocate in said plunger bore between a retracted position and an advanced position; and a portion of said plunger bore and said plunger define a fuel pressurization chamber that is open to said nozzle chamber.

20. The fuel injection system of claim 18 wherein said source of high pressure fluid is said fuel pressurization chamber.

21. The fuel injection system of claim 18 wherein said actuation fluid is lubricating oil.

22. The fuel injection system of claim 18 wherein said at least one control valve includes a direct control valve member mounted to reciprocate in said injector body between an off position in which said needle control chamber is open to said fuel pressurization chamber and an on position in which said needle control chamber is open to said low pressure passage.

23. The fuel injection system of claim 22 wherein said direct control valve member includes a hydraulic pressure surface opening to an actuation fluid control passage in said injector body and positioned to produce a hydraulic force on said direct control valve member toward said on position;

means, within said injector body, for biasing said direct control valve member toward said off position;

said actuation fluid control valve closes said actuation fluid control passage ton actuation fluid inlet when in said second position and said actuation fluid control passage is open to a low pressure drain when in said first position.

24. The fuel injection system of claim 23 wherein said direct control valve member is a spool valve member.

25. The fuel injection system of claim 18 wherein said actuation fluid control valve has a three position solenoid attached to an actuation valve member.

26. The fuel injection system of claim 25 wherein said injector body includes an actuation fluid control passage that communicates actuation fluid pressure to said needle valve; and said actuation fluid control passage and said actuation fluid cavity being closed to said actuation fluid inlet when said actuation valve member is in said first position;

said actuation fluid control passage and said actuation fluid cavity being opened to said actuation fluid inlet when said actuation valve member is in said second position; and said actuation fluid control passage is closed to said actuation fluid inlet and said actuation fluid cavity is opened to said actuation fluid inlet when said actuation valve member is in a third position.

27. The fuel injection system of claim 26 wherein said actuation valve member is a spool valve member.

28. The fuel injection system of claim 27 further comprising a sleeve valve member with a hollow interior and at least one radial flow opening, and being movable between an opened position and a closed position; and said hollow interior being open to said actuation fluid inlet.

29. The fuel injection system of claim 28 wherein said hollow interior opens to an actuation fluid drain passage in said injector body;

a ball valve movable by said actuation valve member between a first position in which said actuation fluid drain passage is closed to said hollow interior and a second position in which said actuation fluid drain passage is opened.

30. The fuel injection system of claim 18 wherein said source of high pressure fluid is said actuation fluid inlet.

31. The fuel injection system of claim 30 wherein said needle valve includes a needle portion with an opening hydraulic surface exposed to pressure in said nozzle chamber and an end portion with a closing hydraulic surface exposed to pressure in said needle control chamber.

32. A method of fuel injection comprising the steps of:

providing a hydraulically actuated fuel injector having a nozzle outlet that pens to a nozzle chamber in which a needle valve reciprocates, and said needle valve having a closing hydraulic surface exposed to pressure in a needle control chamber, and said injector also having at least one control valve that alternately opens said needle control chamber to a source of high pressure fluid or a low pressure passage, and said at least one control valve including an actuation fluid control valve that alternately opens an actuation fluid cavity to an actuation fluid inlet or an actuation fluid drain;

hydraulically pressurizing fuel in said nozzle chamber to an injection pressure at least in part by moving said actuation fluid control valve to open said actuation fluid cavity to said actuation fluid inlet;

moving said needle valve to an opened position to open said nozzle outlet to said nozzle chamber at least in part by opening said needle control chamber to said low pressure passage with said at least one control valve; and moving said needle valve to a closed position to close said nozzle outlet to said nozzle chamber at least in part by opening said needle control chamber to said source of high pressure fluid with said at least one control valve.

33. The method of claim 32 wherein said step of moving said needle valve to said opened position includes the steps of:

providing said needle valve with an opening hydraulic surface exposed to pressure in said nozzle chamber;

biasing said needle valve toward said closed position with a spring; and said step of hydraulically pressurizing raises fuel pressure in said nozzle chamber above a valve opening pressure sufficient to overcome said spring.

34. The method of claim 33 further comprising the step of opening said needle control chamber to said source of high pressure fluid with said at least one control valve after initiating said step of hydraulically pressurizing but before fuel in said nozzle chamber rises above said valve opening pressure.

35. The method of claim 34 wherein said injector body has a plunger bore and a piston bore;

said actuation fluid control valve mounted in said injector body has a first position in which said actuation fluid cavity is open to said actuation fluid inlet and a second position in which said actuation fluid cavity is open to said actuation fluid drain;

an intensifier piston positioned to reciprocated in said piston bore between a forward position and a return position;

a plunger positioned to reciprocate in said plunger bore between a retracted position and an advanced position; and said step of hydraulically pressurizing includes a step of moving said actuation fluid control valve to said first position.

36. The method of claim 35 wherein a portion of said plunger bore and said plunger define a fuel pressurization chamber; and said source of high pressure fluid is said fuel pressurization chamber.

37. The method of claim 36 wherein said actuation fluid is lubricating oil.

38. The method of claim 34 wherein said at least one control valve includes a direct control valve member mounted to reciprocate in said injector body between an off position in which said needle control chamber is open to said source of high pressure fluid and an on position in which said needle control chamber is open to said low pressure passage;

said step of moving said needle valve to said opened position includes a step of moving said direct control valve member to said on position; and said step of moving said needle valve to said closed position includes a step of moving said direct control valve member to said off position.

39. The method of claim 38 wherein said direct control valve member includes a hydraulic pressure surface opening to an actuation fluid control passage in said injector body and positioned to produce a hydraulic force on said direct control valve member toward said on position;

said step of moving said needle valve to said opened position includes a step of opening said actuation fluid control passage to said actuation fluid inlet; and said step of moving said needle valve to said closed position includes a step of opening said actuation fluid control passage to said actuation fluid drain.

40. The method of claim 34 wherein said step of moving said needle valve to said opened position and said step of moving said needle valve to said closed position occur during said step of hydraulically pressurizing fuel.

41. The method of claim 34 wherein said at least one control valve includes a three position actuation fluid control valve;

moving said actuation fluid control valve to a second position before said step of hydraulically pressurizing;

said step of hydraulically pressurizing is initiated by a step of moving said actuation fluid control valve to a first position;

said step of moving said needle valve to an opened position is initiated by a step of moving said actuation fluid control valve to a third position; and said step of moving said needle valve to a closed position is accomplished at least in part by moving said actuation fluid control valve back to said first position.

42. The method of claim 34 wherein said source of high pressure fluid is a fuel pressurization chamber.

43. The method of claim 34 wherein said source of high pressure fluid is said actuation fluid inlet.

* * * * *